United States Patent
Abedini et al.

(10) Patent No.: US 11,227,094 B2
(45) Date of Patent: Jan. 18, 2022

(54) SYSTEM, METHOD, RECORDING MEDIUM FOR DYNAMICALLY CHANGING SEARCH RESULT DELIVERY FORMAT

(71) Applicant: International Business Machines Corporation, Armonk, NY (US)

(72) Inventors: Mani Abedini, Pascoe Vale (AU); Thomas Charles Conway, Heidelberg West (AU); Fatemeh Jalali, Melbourne (AU); Fang Lu, Billerica, MA (US); Lenin Mehedy, Doncaster East (AU); Shaila Pervin, Docklands (AU)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/426,312

(22) Filed: May 30, 2019

(65) Prior Publication Data
US 2019/0278830 A1 Sep. 12, 2019

Related U.S. Application Data

(63) Continuation of application No. 15/191,687, filed on Jun. 24, 2016, now Pat. No. 10,387,538.

(51) Int. Cl.
*G06F 40/103* (2020.01)
*H04L 29/08* (2006.01)
*G06F 16/9038* (2019.01)

(52) U.S. Cl.
CPC ........ *G06F 40/103* (2020.01); *G06F 16/9038* (2019.01); *H04L 67/22* (2013.01)

(58) Field of Classification Search
None
See application file for complete search history.

(56) References Cited

U.S. PATENT DOCUMENTS

| 4,692,941 A | 9/1987 | Jacks et al. |
|---|---|---|
| 6,338,034 B1 | 1/2002 | Ishikawa et al. |
| 6,904,560 B1 | 6/2005 | Panda |
| 6,990,634 B2 | 1/2006 | Conroy et al. |

(Continued)

OTHER PUBLICATIONS

United States Notice of Allowance dated May 12, 2019, in U.S. Appl. No. 15/191,687.

(Continued)

*Primary Examiner* — Richard L Bowen
(74) *Attorney, Agent, or Firm* — Joseph Petrokaitis, Esq.; McGinn I.P. Law Group, PLLC.

(57) ABSTRACT

A result format modifying method, system, and non-transitory computer readable medium, include extracting, from a database including a plurality of display format types of a search result of a search conducted by a user, the plurality of display format types of the search result conducted by the user, and deciding a display format of the plurality of display format types to output to the user based on a time interval between a current time and the start time of the user's next activity as determined by the determining, where the display format of the search result to the user corresponds to a delivery that is digestible by the user within a specific length of a time interval out of a first time interval and a second time interval, the first time interval being longer than the second time interval.

18 Claims, 5 Drawing Sheets

(56) References Cited

U.S. PATENT DOCUMENTS

| | | | |
|---|---|---|---|
| 7,398,196 B1 | 7/2008 | Liu et al. | |
| 8,126,865 B1 * | 2/2012 | Bharat | G06F 16/972 |
| | | | 707/706 |
| 8,244,874 B1 | 8/2012 | Thireault | |
| 8,769,008 B1 | 7/2014 | Young et al. | |
| 9,025,192 B1 | 5/2015 | Majid et al. | |
| 9,842,113 B1 | 12/2017 | Sorvillo et al. | |
| 10,178,059 B1 * | 1/2019 | Garg | H04L 51/08 |
| 2008/0319980 A1 | 12/2008 | Pickens et al. | |
| 2010/0198812 A1 | 8/2010 | Athsani et al. | |
| 2012/0053829 A1 | 3/2012 | Agarwal et al. | |
| 2014/0006399 A1 | 1/2014 | Vasudevan et al. | |
| 2014/0075312 A1 | 3/2014 | Dingsor et al. | |
| 2014/0344266 A1 * | 11/2014 | Bennett | G06F 16/248 |
| | | | 707/734 |
| 2015/0370818 A1 | 12/2015 | Des Jardins et al. | |
| 2016/0070683 A1 | 3/2016 | Thorn | |
| 2016/0119274 A1 * | 4/2016 | Ghafourifar | H04L 51/14 |
| | | | 709/206 |
| 2017/0017672 A1 | 1/2017 | Fan et al. | |
| 2017/0199918 A1 | 7/2017 | Nakahashi | |
| 2017/0300476 A1 * | 10/2017 | Hampson | G06F 40/58 |

OTHER PUBLICATIONS

United States Office Action dated Jan. 18, 2019, in U.S. Appl. No. 15/191,687.

United States Office Action dated Oct. 22, 2018, in U.S. Appl. No. 15/191,687.

United States Office Action dated Jun. 15, 2018, in U.S. Appl. No. 15/191,687.

Mel, et al. "The NIST Definition of Cloud Computing". Recommendations of the National Institute of Standards and Technology. Nov. 16, 2015.

* cited by examiner

FIG. 2

RESULT FORMAT MODIFYING METHOD 200

SYSTEM, METHOD, RECORDING MEDIUM FOR DYNAMICALLY CHANGING SEARCH RESULT DELIVERY FORMAT

CROSS-REFERENCE TO RELATED APPLICATIONS

The present application is a Continuation Application of U.S. patent application Ser. No. 15/191,687, filed on Jun. 24, 2016, the entire contents of which are hereby incorporated by reference.

BACKGROUND

The present invention relates generally to a result format modifying system, and more particularly, but not by way of limitation, to a system and method for improving a user's productivity by delivering personalized search results in different formats and with different levels of details, at real-time as well as off-line simultaneously, based on the user's schedule, situation, and connection availability.

People have very busy schedules for their work and lives. Improvements in computer technology has enabled easy access to a plethora of information through Internet and search engines.

Conventional search engines are able to present relevant and personalized search results, to a degree, based on the users' previous search queries and location, if browser cookies are enabled. However, search results are presented with the same level of details every time (e.g. few extracted lines from the source of each result). That is, there is a technical problem in the conventional search engine result delivery techniques in that the format of the results often requires users to spend a considerable amount to time to isolate the most relevant information and create a summarized report from these search results. Thus, a user may not be able to consume the information within the time frame to which the user has access before moving on to the next event on her schedule. Also, the conventional techniques do not cause the full list of relevant search results to be stored automatically for off-line access so that a user may visit those later for detailed investigation. Accordingly, the technical problems in the conventional techniques often cause the user to fail to receive information with an appropriate level of details based on their time availability from the search engines (or similar Question and Answer techniques).

SUMMARY

In view of the technical problem, the inventors have considered a non-abstract improvement to a computer technology via a technical solution to the technical problem in which a system can modify the format of the search results based on a user's schedule, predicted upcoming location, and connection availability, thereby to significantly improve the user's productivity.

In an exemplary embodiment, the present invention can provide a result format modifying system, including an extracting circuit configured to extract a plurality of format types of a search result conducted by a user, a determining circuit configured to determine user activity based on user data, and a deciding circuit configured to decide a format of the plurality of format types to deliver to the user based on a time interval between a current time and a start time of the user's next activity as determined by the determining circuit.

Further, in another exemplary embodiment, the present invention can provide a result format modifying method, including extracting a plurality of format types of a search result conducted by a user, determining user activity based on user data, and deciding a format of the plurality of format types to deliver to the user based on a time interval between a current time and a start time of the user's next activity as determined by the determining.

Even further, in another exemplary embodiment, the present invention can provide a non-transitory computer-readable recording medium recording a result format modifying program, the program causing a computer to perform: extracting a plurality of format types of a search result conducted by a user, determining user activity based on user data, and deciding a format of the plurality of format types to deliver to the user based on a time interval between a current time and a start time of the user's next activity as determined by the determining.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

Figure 1:
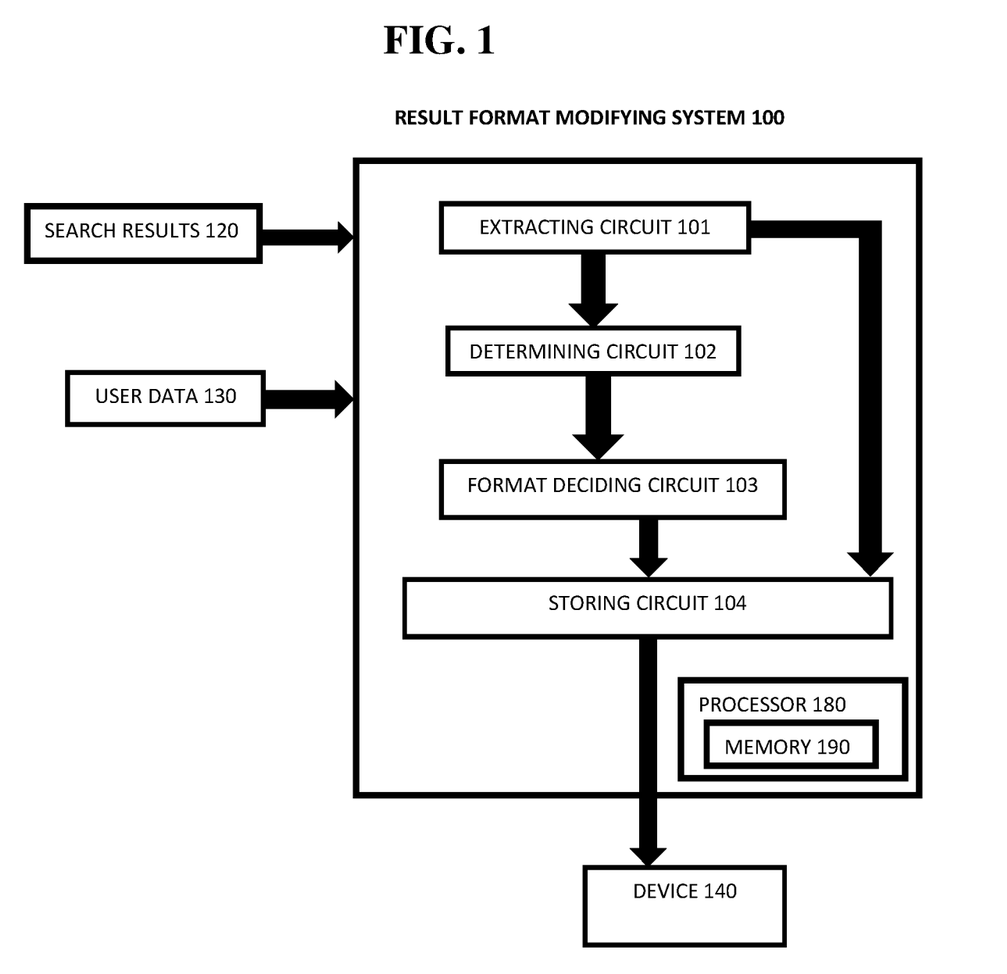
FIG. 1 exemplarily shows a block diagram illustrating a configuration of a result format modifying system 100.

With reference now to FIG. 1, the result format modifying system 100 includes an extracting circuit 101, a determining circuit 102, a format deciding circuit 103, and a storing circuit 104. The result format modifying system 100 includes a processor 180 and a memory 190, with the memory 190 storing instructions to cause the processor 180 to execute each circuit of the result format modifying system 100. The processor and memory may be physical hardware components, or a combination of hardware and software components.

Although the result format modifying system 100 includes various circuits, it should be noted that a result format modifying system can include modules in which the memory 190 stores instructions to cause the processor 180 to execute each module of the result format modifying system 100.

Also, each circuit can be a stand-alone device, unit, module, etc. that can be interconnected to cooperatively produce a transformation to a result.

With the use of these various circuits, the result format modifying system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Figure 3:
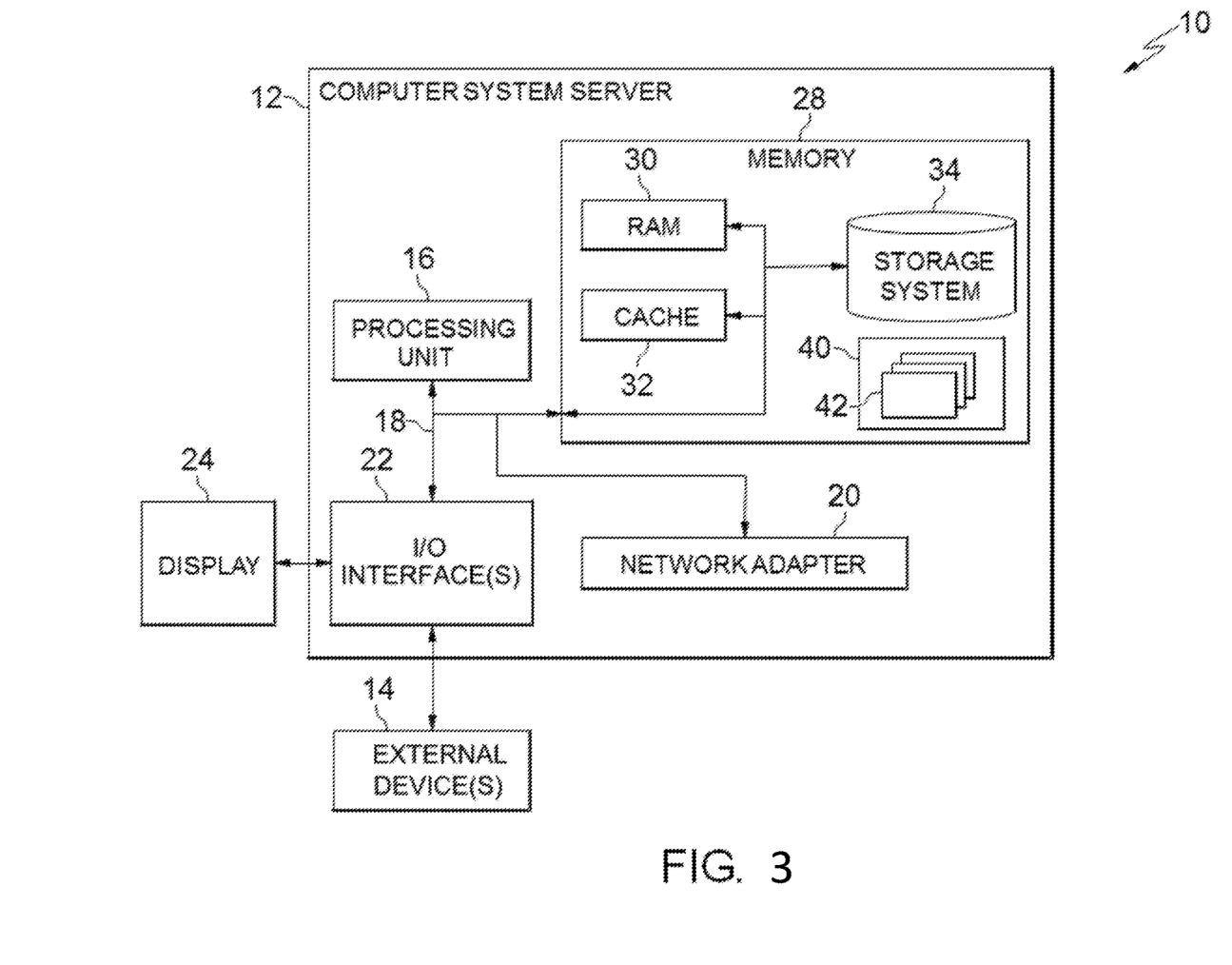
FIG. 3 depicts a cloud computing node 10 according to an exemplary embodiment of the present invention.
Figure 4:
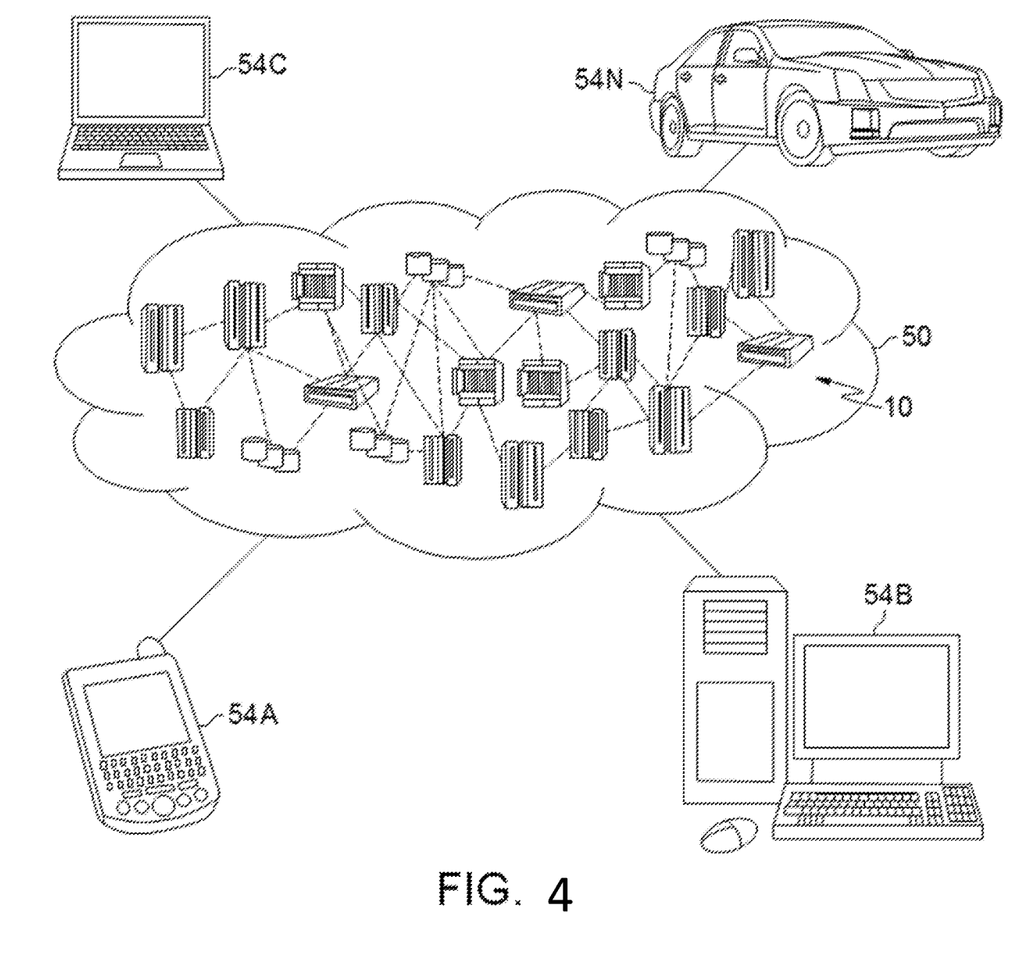
FIG. 4 depicts a cloud computing environment 50 according to another exemplary embodiment of the present invention.
Figure 5:
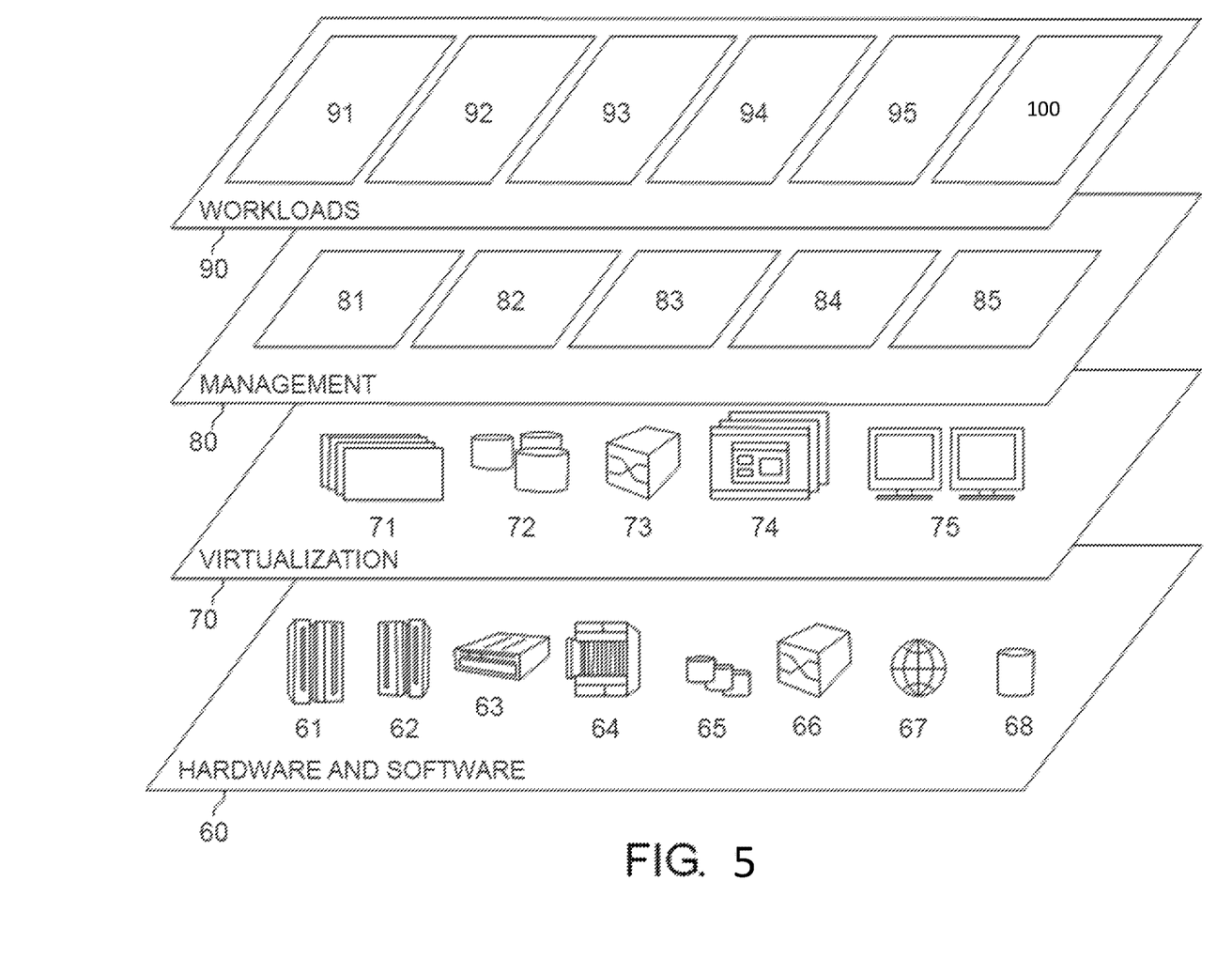
FIG. 5 depicts abstraction model layers according to an exemplary embodiment of the present invention.

Although as shown in FIGS. 3-5 and as described later, the computer system/server 12 is exemplarily shown in cloud computing node 10 as a general-purpose computing circuit which may execute in a layer the result format modifying system 100 (FIG. 5), it is noted that the present invention can be implemented outside of the cloud environment.

A user conducts searches through a search engine, Q&A system, or the like. The result format modifying system 100 receives the search results 120 based on the user's search.

The extracting circuit 101 extracts a plurality of format types of the search results 120. For example, the extracting circuit 101 can extract a format of images from the search results 120 after the user conducts searches from the search engine by identifying key images in a document in correspondence to document text or the like. Further, the extracting circuit 101 can extract a format of a summary of the text information from the raw search results 120 by using textual summarization techniques. Also, the extracting circuit 101 can extract a format of full length text of the search results. That is, the extracting circuit 101 can extract a plurality of format types comprising image icons, image thumbnails, summarized text, full-length text, summarized text in audio (or video) format, full-length text in audio (or video) format, a hard copy print-out, voice or video message format, or the like. In other words, the extracting circuit 101 extracts different ways to deliver the search results 120 to the user based on a situation or, time that the user has to analyze the results. The format types comprise different file types for consumption by the user of the search results 120.

When the extracting circuit 101 extracts the plurality of format types of the search results 120, if the user agrees, the storing circuit 104 can download (store) the full length of the search results 120 in text format to the user's electronic device(s) 140 such as mobile phone or personal/desktop computers, etc. Again, the same text format search results can be converted (as described later) to voice data and be stored. Or, the extracting circuit 101 can cause the storing circuit 104 to store each of the plurality of format types such that the format deciding circuit 103 can work in an "offline" setting (as described later).

The determining circuit 102 determines user activity based on the user data 130. The user data 130 comprises a user's calendar, messages (e.g., e-mail, text messages, etc.), activity stream posts (e.g., via social media, social network, or the like), a location (e.g., driving, near a video (or audio) player, on a plane, etc.), and a situation such as being off-line or having access to a printer or other output device. That is, the determining circuit 102 identifies what the user's schedule is (e.g., a time of an activity (or event) occurring) and the corresponding location or situation associated with the events of the user's schedule. The determining circuit 102 can scan through the user's calendar and activity streams posts to determine the user's activities and corresponding location of those activities. Also, the determining circuit 102 can determine whether the user has access to internet connection (e.g., if the format needs to be downloaded now or can be downloaded later) and hard-copy (or other) printing facilities based on the location data.

For example, the determining circuit 102 can determine the user's activity from text messages from a device, in which a time of the user's next event (e.g., a message from the user stating "I am leaving the office in five minutes") is indicated.

The format deciding circuit 103 decides a format of the plurality of format types to deliver to the user (device 140) based on a comparison of a current time and a time of the user's next activity/event determined by the determining circuit 102. Preferably, the format deciding circuit 103 decides the format by comparing the current time with a start time of the user's next upcoming event and by calculating a time interval between the current time and the start time of the user's next upcoming event.

The format deciding circuit 103 categorizes the time interval as, for example, "short", "moderate", and "long" in which the format delivered to the user is based on the length of the time interval. That is, a "short" time interval may be five minutes or less than an average time it takes the user to process a particular format type (e.g., a threshold between delivering icons versus summary of text or the like). A "moderate" time interval may be categorized as between five and fifteen minutes or more than an average time to process a particular format type (e.g., a threshold between reading icons versus summary of the results and a threshold between the summary of results and a text of full results or the like). A "long" time interval may be greater than fifteen minutes or more than an average time to process a particular format type (e.g., a threshold time interval greater than a time to read a summarized text of search results).

The format deciding circuit 103 can map the time intervals to particular format types such as, for example, delivering a few key images of the search results 120 only for a short interval, a summarized text of the search results 120 for a moderate time interval, or a full-length of the search results 120 for a long time interval. That is, if the format deciding circuit 103 identifies the user has a short period of time to consume the search results before the user moves on to next activity, then the format deciding circuit 103 decides a summary of the text format type (e.g., a format type that can be quickly consumed) is appropriate and summarizes the text into a much simpler version of the textual format. Or, the format deciding circuit 103 can decide a format type that converts the text search results 120 into a voice format through text-to-speech conversion tools (e.g., via real-time text-to-speech conversion techniques). Also, the format deciding circuit can decide a format type by converting the search results into graphical format for the user to easily consume the information by converting the keyword from text into images.

Further, the format deciding circuit 103 can decide the format type based on a situation of the user that is unrelated to time. For example, if the user searches on a mobile device while driving but has no event scheduled, the format deciding circuit 103 can decide to deliver an audio format playable while driving. That is, the system knows the user is driving and this is not available to receive and reuse textual format data. Similarly, if the user is traveling to a location (i.e., a hotel, the user's home, etc) with a printing capability, the format deciding circuit 103 can cause the printer at the location to have a printed-out, hard copy format of the search results (e.g., images, full-text, summarized text, etc.).

Moreover, if the determining circuit 102 determines that the user will be in an "offline" situation, the format deciding circuit 103 pre-converts the search results 120 into formats for the time intervals of the user and causes the storing circuit 104 to store the formats on the device 140 such that the user can access the format types during the offline time (e.g., if the user is on an airplane).

Figure 2:
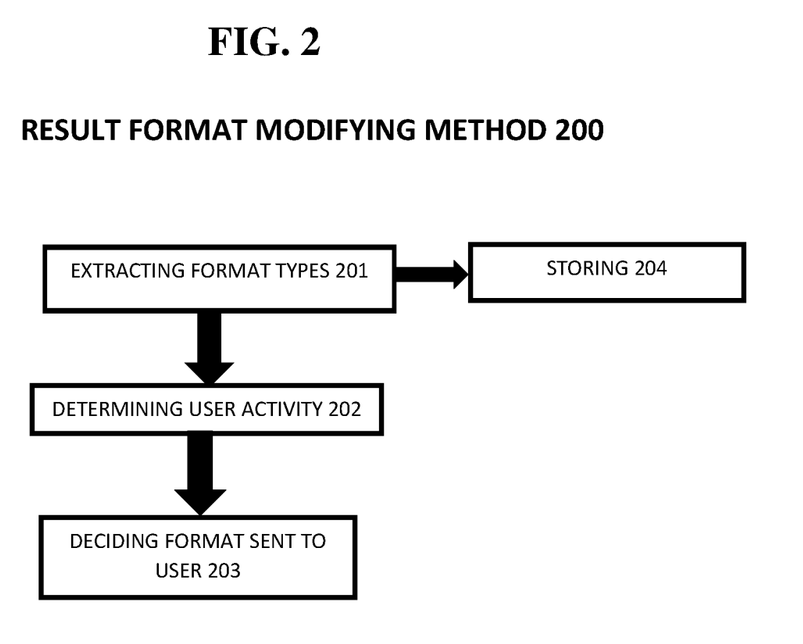
FIG. 2 exemplarily shows a high level flow chart for a result format modifying method 200.

FIG. 2 shows a high level flow chart for a method 200 of result format modifying.

Step 201 extracts a plurality of format types of the search results 120.

Step 202 determines user activity based on the user data 130. The user data 130 comprises a user's calendar, messages (e.g., e-mail, text messages, etc.), activity stream posts (e.g., via social media, social network, or the like), a location (e.g., driving, near a video (or audio) player, on a plane, in a hotel, etc.), and a situation such as being off-line or having access to a printer. That is, Step 202 identifies what the user's schedule is (e.g., a time of an activity (or event) occurring) and the corresponding location or situation associated with the events of the user's schedule.

Step 203 decides a format of the plurality of format types to deliver to the user (device 140) based on a comparison of a current time and a time of the user activity determined by the determining circuit 102. Preferably, Step 203 decides the format by comparing the current time with a start time of the user's next upcoming event and calculating a time interval between the current time and the start time of the user's next upcoming event.

Thus, the system 100 and method 200 can enable a user to quickly understand the search results within the time the user has available by reading the summarized text or the images (e.g., the format type suitable for the user is time). However, the user will be able to revisit the full length of the search results when the user has more time later based on the storing circuit 104 downloading the full search results to a device 140. The user can even review the full length search results while he is off-line since the textual data and voice data have been downloaded to his electronic device. Therefore, the invention can greatly improve user's productivity by providing different formats of the search results 120 based on the user's activity schedule and ability to have access to internet connections. Further, the invention can analyze video and voice files and generate a summary version containing important/relevant slides based on the use needs and times Exemplary Hardware Aspects, Using a Cloud Computing Environment It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 3, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 5 are intended to be illustrative only and that computing nodes 10 and cloud computing environment 50 can communicate with any type of computerized circuit over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the result format modifying system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A result format modifying system, comprising:
a database including a plurality of display format types of a search result for a dynamic single entry search conducted by a user;
a processor; and
a memory, the memory storing instructions to cause the processor to:
extract the plurality of display format types of the search result conducted by the user;
determine a start time of a user's next activity;
decide a display format having a first medium of display of the plurality of display format types to output to the user based on a time interval between a current time and the start time of the user's next activity as determined by the determining, wherein:
the display format of the search result that is decided to the user corresponds to a delivery that is possible by the user to digest within a specific length of a time interval out of a first time interval, a second time interval, and a third time interval, the first time interval being longer than the second time interval, and the second time interval being longer than the third time interval, the delivery being possible to digest based on the display format being able to be digested within a shortest time of the first time interval, the second time interval, and the third time interval;
the display format that is decided is modified to a modified display format from an original format of the search result to correspond to the delivery, the modified display format being a different medium of display; and
the display format that is decided is modified again to a second modified display format from the modified display format when a current user's activity requires outputting the search result in the second modified display format to the user; and output one of the display format, the modified display format, and the second modified display format that is decided of the search result to the user.

2. The system of claim 1, wherein the plurality of display format types comprise at least one of:
icons representing the search results;
image thumbnails representing the search results,
a summarized text for each of the search results;
a full-length text of the search results;
a text-to-audio converted file of the summarized text for each of the search results;
a video file of the summarized text for each of the search results;
a text-to-audio converted file of the full-length text;
a hard copy print-out; and
a voice or a video message.

3. The system of claim 1, wherein the plurality of display format types comprise different file types for consumption by the user within the time interval.

4. The system of claim 1, wherein the memory further stores instructions to cause the processor to store a full-length text of the search results on a device accessible by the user.

5. The system of claim 1, wherein the deciding further decides the display format of the plurality of display format types to deliver to the user based on a location of the user at the start time of the user's next activity.

6. The system of claim 5, wherein the deciding further decides a hard-copy print-out as the display format if the location of the user at the start time of the user's next activity has a printer.

7. The system of claim 1, wherein the deciding further decides the display format of the plurality of display format types to deliver to the user based a situation of the user at the start time of the user's next activity.

8. The system of claim 1, wherein the user data comprises:
a user's electronic calendar,
a message;
an e-mail;
a social media stream; and
social network data.

9. The system of claim 1, wherein the deciding further decides the display format to deliver to the user based on an average consumption time of the display format delivered to the user being less than the time interval.

10. The system of claim 1, wherein the outputting the second modified display format is required when an error would result from the outputting the modified display format due to the current user's activity.

11. A non-transitory computer-readable recording medium recording a result format modifying program, the program causing a computer to perform:
extracting, from a database including a plurality of display format types of a search result for a dynamic single entry search conducted by a user, the plurality of display format types of the search result conducted by the user, each of the plurality of display format types being different format types and corresponding to a different way to communicate the search result to the user;
determining a start time of a user's next activity and that the start time of the user's next activity occurs while the user is offline;
pre-converting the search result into a display format that is accessible offline, wherein:
the display format of the search result that is decided to the user corresponds to a delivery that is accessible offline and that is possible digestible by the user to digest within a specific length of a time interval out of a first time interval, a second time interval, and a third time interval, the first time interval being longer than the second time interval, and the second time interval being longer than the third time interval, the delivery being possible to digest based on the display format being able to be digested within a shortest time of the first time interval, the second time interval, and the third time interval; and
the different format types comprise an image result that corresponds to the first time interval, an audio result that corresponds to the second time interval, and a textual result that corresponds to the third time interval; and
outputting the display format of the search result to the user.

12. The non-transitory computer-readable recording medium of claim 11, wherein the outputting comprises sending the display format to a printer to print a hard copy.

13. The non-transitory computer-readable recording medium of claim 11, wherein the outputting comprises downloading the display format to be accessed offline.

14. The non-transitory computer-readable recording medium of claim 11, wherein the first time interval, the second time interval, and the third time interval each comprise a different length of time.

15. A result format modifying method, comprising:
extracting, from a database including a plurality of display format types of a search result for a dynamic single entry search conducted by a user, the plurality of display format types of the search result conducted by the user, each of the plurality of display format types being different format types and corresponding to a different way to communicate the search result to the user;
determining a start time of a user's next activity and that the start time of the user's next activity occurs while the user is offline;
pre-converting the search result into a display format that is accessible offline,
wherein:
the display format of the search result that is decided to the user corresponds to a delivery that is accessible offline and that is possible by the user to digest within a specific length of a time interval out of a first time interval, a second time interval, and a third time interval, the first time interval being longer than the second time interval, and the second time interval being longer than the third time interval, the delivery being possible to digest based on the display format being able to be digested within a shortest time of the first time interval, the second time interval, and the third time interval; and
the different format types comprise an image result that corresponds to the first time interval, an audio result that corresponds to the second time interval, and a textual result that corresponds to the third time interval; and
outputting the display format of the search result to the user.

16. The method of claim 15, wherein the plurality of display format types comprise different file types for consumption by the user within the time interval.

17. The method of claim 15, wherein the memory further stores instructions to cause the processor to store a full-length text of the search results on a device accessible by the user.

18. The method of claim 15, wherein the deciding further decides the display format of the plurality of display format types to deliver to the user based on a location of the user at the start time of the user's next activity.

\* \* \* \* \*